United States Patent
Gaultier

(10) Patent No.: US 6,771,716 B1
(45) Date of Patent: Aug. 3, 2004

(54) METHOD OF COMMUNICATION WITH COHERENCE CHECKING AND DEVICE FOR THE IMPLEMENTATION THEREOF

(75) Inventor: Jean-Marie Gaultier, Rousset (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/229,127

(22) Filed: Jan. 12, 1999

(30) Foreign Application Priority Data

Jan. 14, 1998 (FR) .............................................. 98 00318

(51) Int. Cl.[7] .............................. H03D 1/00; H04L 27/06
(52) U.S. Cl. ...................................... 375/340; 375/369
(58) Field of Search ................................ 375/340, 369, 375/259, 260, 213; 714/709, 800, 802, 819, 825

(56) References Cited

U.S. PATENT DOCUMENTS

| | | | |
|---|---|---|---|
| 4,631,666 A | | 12/1986 | Harris et al. ................. 710/129 |
| 4,845,504 A | * | 7/1989 | Roberts et al. .............. 342/457 |
| 5,050,166 A | * | 9/1991 | Cantoni et al. .............. 370/473 |
| 5,265,093 A | * | 11/1993 | Dissosway et al. |
| 5,590,273 A | | 12/1996 | Balbinot ......................... 714/3 |
| 5,854,454 A | * | 12/1998 | Upender et al. ............ 187/247 |
| 5,949,414 A | * | 9/1999 | Namikata et al. ........... 345/753 |
| RE37,494 E | * | 1/2002 | Cantoni et al. ........... 370/395.6 |

FOREIGN PATENT DOCUMENTS

DE 30 39 306 A 5/1981 ........... H04L/25/00

* cited by examiner

Primary Examiner—Jean B. Corrielus
(74) Attorney, Agent, or Firm—Lisa K. Jorgenson; Allen, Dyer, Doppelt, Milbrath & Gilchrist, P.A.

(57) ABSTRACT

A method of communication between a master unit and a slave unit is of the type including the transmission of messages comprising a useful information word, as well as one or more service bits. The messages include two bits to encode the end-of-transmission information. The value of these bits provides information on the nature of the useful information transmitted to thereby improve the integrity of the communications.

34 Claims, 3 Drawing Sheets

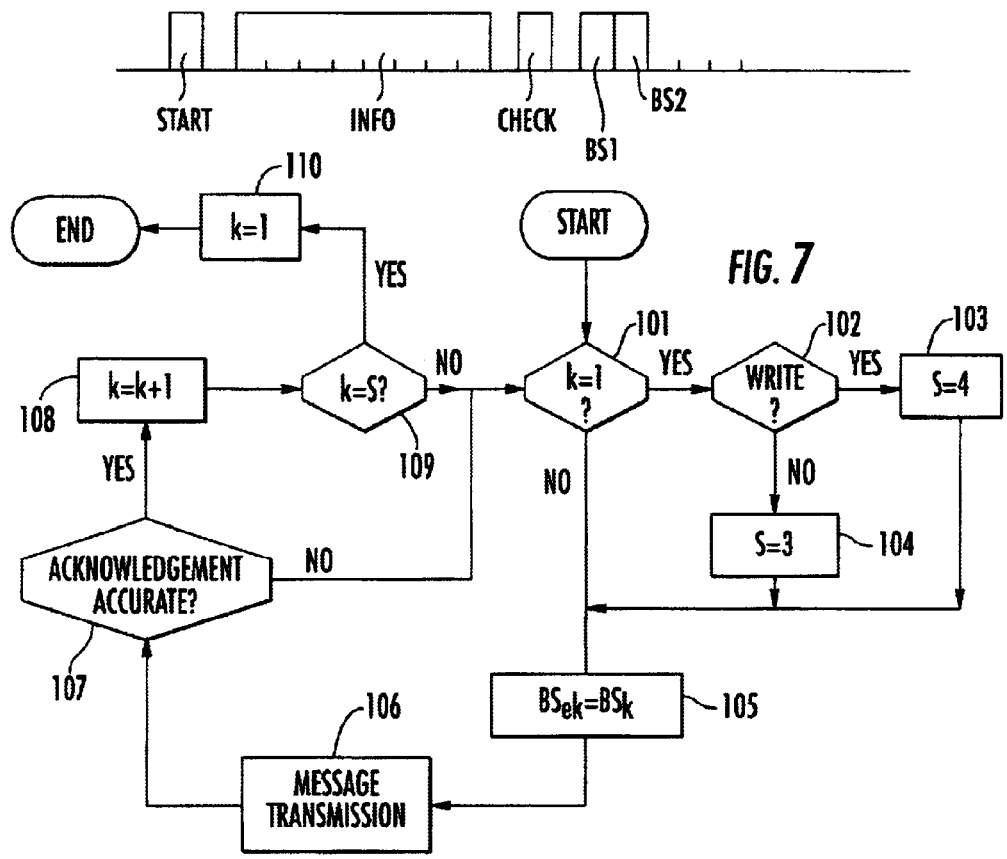
FIG. 5
FIG. 7
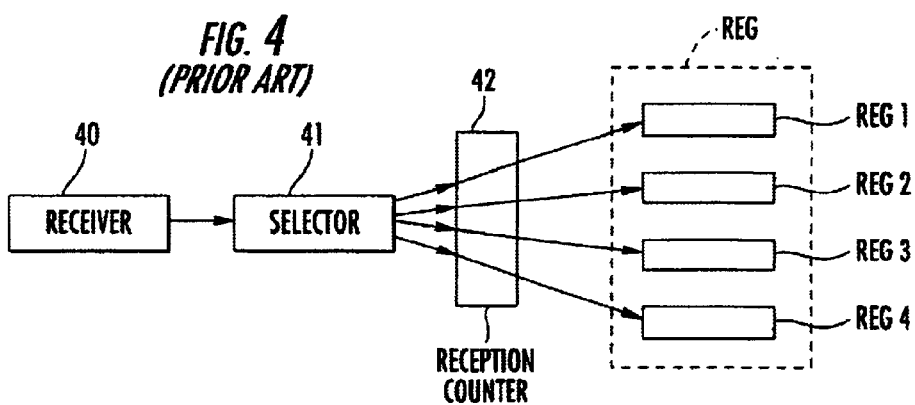
FIG. 4
(PRIOR ART)

METHOD OF COMMUNICATION WITH COHERENCE CHECKING AND DEVICE FOR THE IMPLEMENTATION THEREOF

FIELD OF THE INVENTION

The present invention relates to a method of communication, and, more particularly, to a method of digital communication between a master unit and a slave unit.

BACKGROUND OF THE INVENTION

Digital transmissions, such as between a master and a slave, can be made over different media. The transmission channels may be wire links or optical fibers or the space between two antennas. FIG. 1 shows an exemplary communication using RF links. In this figure, a master unit 1 uses a transceiver antenna 11 to exchange messages with a slave unit 2 also equipped with a transceiver antenna 22. The transmission channel is through air between the two antennas 11 and 22.

The master unit and the slave unit may each either transmit messages to the other unit or receive messages from the other unit. The master unit is distinguished from the slave unit in that it is the master unit that takes the initiative in the communication. The master unit may thus be, for example, the central processing unit of a computer. The slave unit may then be one of its peripherals, such as, a printer that is remote-controlled by any transmission channel.

In the prior art, there are known methods of communication including the transmission of messages comprising a useful information word and one or more service bits. The transmission is carried out serially according to a specified communications protocol. A protocol of this kind specifies the format and the syntax of the messages that are transmitted by the master unit to the slave unit or vice versa. The transmission is done synchronously. It is sequenced at a specified rate, the units using known approaches to lock in to the rate of one and the same clock or two synchronous or bi-synchronous clocks.

FIG. 2 shows a fairly simple example of a known message format. The message comprises first of all a starting bit START whose function is to synchronize the clock of the addressee unit with the received message. Then, the message comprises a useful information word INFO that is encoded, for example, on eight bits (one byte). This word may be an instruction word whose value indicates the nature of a command to be carried out by the addressee unit. This instruction may, for example, be a read or write command. It may also be an address word whose value indicates the address or a part of the address of a memory location of the addressee unit. At this memory location of the addressee unit, a data element may, for example, be read or written. Finally, it may also be a data word whose value indicates the value of a data element processed by the addressee unit.

The message also comprises a check bit CHECK which, in particular, may be a parity check bit. The value of the parity check bit CHECK is fixed at the logic value 1 or 0. This value is determined in such a way that the sum of the values of the bits of the useful information INFO gives an even value or an odd value depending on the type of parity chosen. The role of the parity check bit CHECK is to enable the addressee unit to detect transmission errors if any. In such a case, the addressee unit may, as the case may be, request a retransmission of the message.

Finally, in the prior art, the message comprises an end-of-transmission bit STOP. This bit is used solely to indicate the end of the message. Following this end-of-transmission bit STOP, each protocol generally provides for a number of elementary timing intervals during which a transmission unit no longer transmits any bit on the channel. Thus, the channel is left free so that the addressee unit sends a bit with a specified logic value for the acknowledgment of the communication. The logic value of this acknowledgment bit indicates whether the message has been accurately received.

The basic approach used in the prior art to determine whether the message has been accurately received is the check performed by the parity check bit CHECK. Furthermore, depending on the protocol used, a specified value of the acknowledgment bit prompts a retransmission of the message in the event of incorrect reception. In FIG. 2, four of these elementary timing intervals following the bit STOP have been shown.

In electronic systems, there are a very large number of different communication protocols. Each protocol is suited to specific constraints of a given application. These constraints may be the size of the words to be transmitted, the need to secure communications against passive or active intervention by ill-intentioned individuals, constraints related to an acknowledgment mode, maximum duration of transmission in relation to the bit rate, etc. Within such a system, the master unit and the slave unit conform to a common communications protocol so that they can communicate with each other intelligibly.

In general, the information on the communications protocols developed by electronics systems manufacturers is widely disseminated. These manufacturers thus enable other manufacturers to incorporate these systems into more complex assemblies or develop new industrial and/or commercial applications thereof.

The result thereof, with respect to the size of the communications in which such protocols are used, is that the integrity of the information transmitted has to be optimum. In other words, it is necessary for the transmission to be affected by a minimum of errors. Furthermore there are applications where the integrity of the information exchanged is a major constraint in the specifications. In the prior art, the control of the quality of the transmission of the binary signals lies basically in the analysis and interpretation of the value of the parity check bit CHECK mentioned above.

Unfortunately, this check is not completely reliable. In particular, it proves to be valid only when an odd number of bits has been transmitted erroneously. Indeed, even numbers of errors are likely to compensate for one another with respect to the parity check bit. FIGS. 3A, 3B and 3C show three cases of possible transmission. For these examples, the message format of the kind shown in FIG. 2 has been kept. No special attention has been paid in these figures, to the value of the starting bit START and end-of-transmission bit STOP. All that has been taken into account here is the values of the useful information word bit INFO and the parity check bit CHECK.

FIG. 3A shows the case of a useful information bit INFO1 received without transmission errors. It has been chosen arbitrarily to give the logic value 1 to seven first bits B1, B2, B3, B4, B5, B6, B7 of the useful information word INFO1. A last it B8 of the useful information word INFO1 is set at the logic value 0. If it is chosen to adopt a so-called even type of parity, the parity check bit CHECK will then take the logic value 1. In the case of FIG. 3A, the transmission of the useful information word INFO1 is not affected by errors. A useful information word INFO2 which is the word resulting from the transmission of the useful information word INFO1 consequently has the same binary values for each of the bits.

In general, a circuit formed by elementary logic gates is used to ascertain that the result of the transmission of the useful word is in accordance with the result expected with regard to the value of the parity check bit and depending on the type of parity adopted. FIG. 3B shows the case of the same useful information word INFO1 received with a transmission error. A useful information word INFO3 is received in the reception unit following the transmission of the useful information word INFO1. In FIG. 3B, the eighth bit B8 of the useful information word INFO3 is different from the eighth bit of the useful information word INFO1. The transmission has therefore been erroneous and the useful information word INFO3 is then no longer matched with the parity check bit CHECK. It would have been the same if three, five or seven of the eight bits constituting the useful information word INFO3 had been different from the bits of the useful information word INFO1. Indeed, in all cases, the sum of the eight bits of the useful information word INFO3 added to the value of the parity check bit CHECK gives an odd number, while the type of parity is a so-called even type of parity.

FIG. 3C shows the useful information word INFO1 which was transmitted to the reception unit in the form of a useful information word INFO4. The seventh and eighth bits of the useful information word INFO4 are different from the seventh and eighth bits of the useful information word INFO1. However, if we take the sum of the values of the bits of the information word INFO4 added to the value of the parity check bit CHECK, we find an even number. This result therefore matches the type of parity chosen. The same would have been the case if four, six or eight of the bits of the information word INFO1 had been transmitted wrongly to the reception unit.

With the analysis of these three figures, therefore, it can be shown that the existence of the parity bit is not always sufficient to ensure the integrity of the transmitted data. To this, it must be added that the parity bit itself may be wrongly transmitted. This could even lead to cases where the useful information word INFO1 present in the above three figures could have been transmitted correctly, but in which the parity bit itself introduces an error.

The prior art furthermore discloses the existence of counters operating on two bits, a first counter in the reception unit and a second counter in the transmission unit. These counters are designated as a reception counter and a transmission counter. At each new reception of a message that is properly acknowledged, these counters are incremented and the useful information word INFO is directed towards a register that is determined by the value of the reception counter. Each of these registers is proper to the nature of this useful information word INFO. A typical sequence of transmission of a message may be subdivided into a succession of receptions of useful information words.

FIG. 4 shows a diagrammatic view of the reception of a message according to the prior art. For a write operation, a transmission sequence of a message can be subdivided most usually into four phases of transmission and reception. The order of these phases is important. In a first phase, a reception unit 40 receives a useful information word corresponding to a code pertaining to an instruction to be performed. A reception selector 41 directs the code of the instruction into a first specific register REG1 of a battery of registers REG. Then, a reception counter 42 is incremented by one unit. The battery of registers REG has three other registers REG2, REG3 and REG4.

The second phase of the reception is the reception of the least significant bits of the address. The reception selector 41 directs this part of the address into a second register REG2 of the battery of registers REG proper to this type of data. The reception counter 42 is again incremented by one unit.

The third phase of the reception is the reception of the most significant bits of the address. This useful information is also directed by the reception selector 42 in a third register REG3 of the battery of registers REG. Then, a new incrementation of the reception counter 42 takes place. Then comes the last phase of the reception which includes the reception of the data information. This information is stored in a fourth register REG4 of the battery of registers REG. The reception counter 42 is reinitialized.

Should the first information element transmitted to the reception unit 40 be a code corresponding to a read instruction, the reception counter will resume its initial value after only three useful information bits received. Indeed, in the read mode, it is not necessary to send any useful data information.

At each reception of a useful piece of information considered to be accurate with respect to the parity check bit, an acknowledgment bit is sent to the transmission unit. The transmission counter is then itself incremented.

The prior art discloses systems in which, in the event of an error detected during the interpretation of the parity check bit CHECK, the totality of the transmission sequence is reiterated. In the prior art, in the event of problems during transmission, such as, the loss or omission of the dispatching of useful information, the reception unit will not acknowledge accurate reception of the expected useful information. The bit counter will then not be incremented. Thus, the following useful information is directed towards registers that are not appropriate to this information. This inevitably leads to a transmission error which may cause varying degrees of undesired operation or failure.

SUMMARY OF THE INVENTION

The object of the present invention is to mitigate the above mentioned drawbacks of the prior art. Indeed, the invention is directed to a method of communication between a master unit and a slave unit of the type including the transmission of messages comprising a useful information word of a specified type, as well as service bits. The service bits comprise at least one coherence bit whose value signifies the type of useful information transmitted. Thus, the communication is made more reliable by an additional check on the integrity of the received message. In substance, supplementary means is thus introduced into the protocol itself to verify the integrity of the information transmitted.

BRIEF DESCRIPTION OF THE DRAWINGS

Other objects, features and advantages of the present invention will become apparent from the detailed description of the invention which follows, when considered in light of the accompanying drawings in which:

FIG. 4 is a diagrammatic view of the reception of a prior art message, and has already been described;

FIG. 5 shows an exemplary format, according to the invention, of a message;

FIG. 7 shows a flow chart of a program to implement the method according to the invention, at the transmission of a message.

DETAILED DESCRIPTION OF THE PREFERRED EMBODIMENTS

Figure 1:
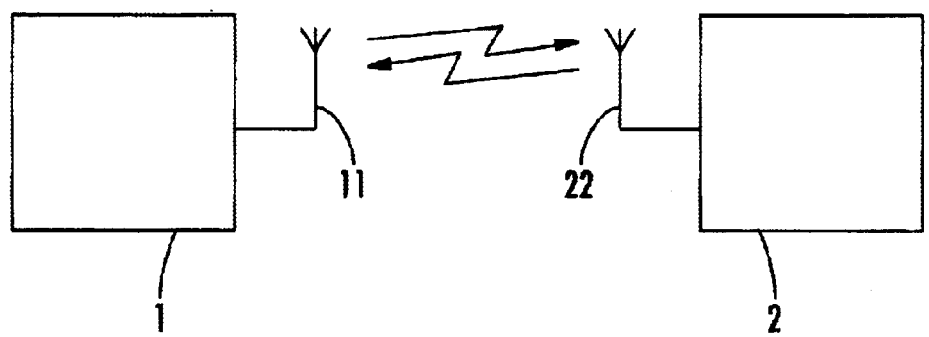
FIG. 1 which has already been described, shows a master unit and a slave unit capable of exchanging messages as in the prior art.
Figure 2:
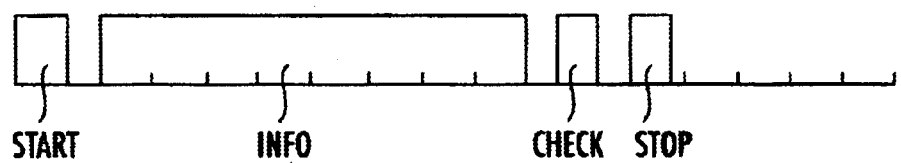
FIG. 2, which has already been described, shows an exemplary known prior format of a message.
Figure 3A:
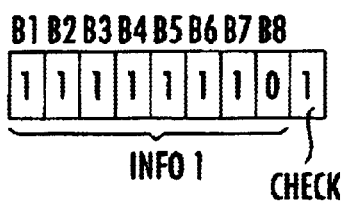
FIGS. 3A, 3B and 3C, which have also been already described, show different examples to illustrate the role and limits of the parity check bit as in the prior art.
Figure 3B:
Figure 3C:
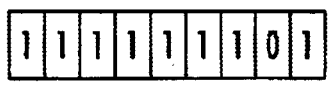

The message format according to a preferred example of the invention shown in FIG. 5 corresponds to the prior art format shown in FIG. 2 except that each message has two coherence bits BS1 and BS2. In this preferred application of the invention, the service bits comprise two coherence bits. In the example described, these two coherence bits further indicate the end of the message. These two bits are therefore used, in this preferred example, as end-of-transmission bits. However, it is no longer their only role. They also make it possible to distinguish the nature of the useful information contained in the transmitted message. Thus, the value of these two additional bits BS1 and BS2 is defined beforehand by a set of rules establishing the link between the value of the binary signals of the bits BS1 and BS2 and the nature of the useful information transmitted. In other embodiments of the invention, the service bits may comprise a word of more than two coherence bits.

The useful information transmitted is always either an instruction or a memory address or a data element. If necessary, a distinction will be made even between the most significant bits of a memory address and the least significant bits of a memory address. Two end-of-transmission bits are therefore sufficient to distinguish all the types of useful information transmitted during a communication. They are also sufficient, if necessary, to distinguish between the most significant bits and the least significant bits of a memory address, or of a data element transmitted. Following these two end-of-transmission bits, BS1 and BS2, the protocol always provides for a certain number of elementary timing intervals during which the transmission unit no longer sends out any bit on the channels.

The values of the end-of-transmission bits BS1 and BS2 evolve according to a specified known table of correspondence of the master unit and the slave unit. Preferably, the value of the end-of-transmission bits BS1 and BS2 evolves only after a transmission of a message between the master unit and the slave unit that has been appropriately acknowledged. An appropriately acknowledged communication is a communication for which the addressee unit of the message has transmitted an acknowledgment word indicating that the useful information has been appropriately received.

This condition for the development of the values of the end-of-transmission bits has the advantage of preventing any loss of correspondence between the value of the end-of-transmission bits stored by the master unit, on the one hand, and by the slave unit, on the other hand. Indeed, it could be the case that a message has not been received by the slave unit or has been received incompletely or imperfectly. Consequently, the slave unit will not be able to take into account the corresponding evolution of the end-of-transmission bits that have come into play from the viewpoint of the master unit. A loss of correspondence of this kind would occur necessarily if the values of the end-of-transmission bits BS1 and BS2 were to evolve at each transmission of a message by the master unit.

Figure 6:
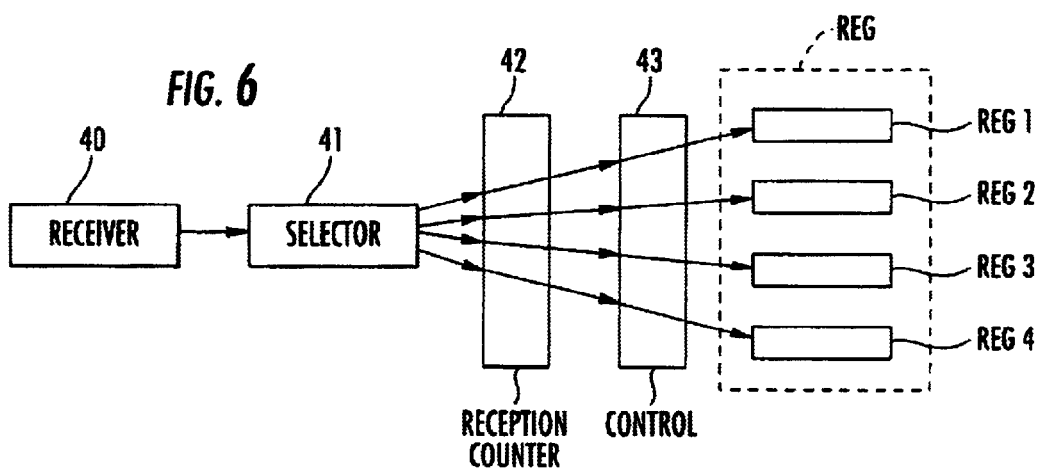
FIG. 6 provides a diagrammatic view of the reception of a message according to the invention.

FIG. 6 shows a device for the reception of a message according to the invention. FIG. 6 shows the same elements as those present in FIG. 4: a reception unit 40, a reception selector 41, a reception counter 42, and a battery of registers REG. The battery of registers REG is still provided by the four registers REG1, REG2, REG3 and REG4.

FIG. 6 also shows a check unit 43 carrying out a coherence test. This check unit 43 ascertains that the code borne by the two end-of-transmission bits BS1 and BS2 is in accordance with the nature of the useful information expected. The control unit 43 furthermore comprises a circuit or means to extract the useful information word and the coherence bit or bits from the received message. Finally, the check unit 43 comprises a circuit or means to increment the reception counter as a function of the result of a coherence test between the type of useful information transmitted and the value of the coherence bit or bits. This check unit 43 may, for example, be a circuit based on elementary logic gates.

Figure 8:
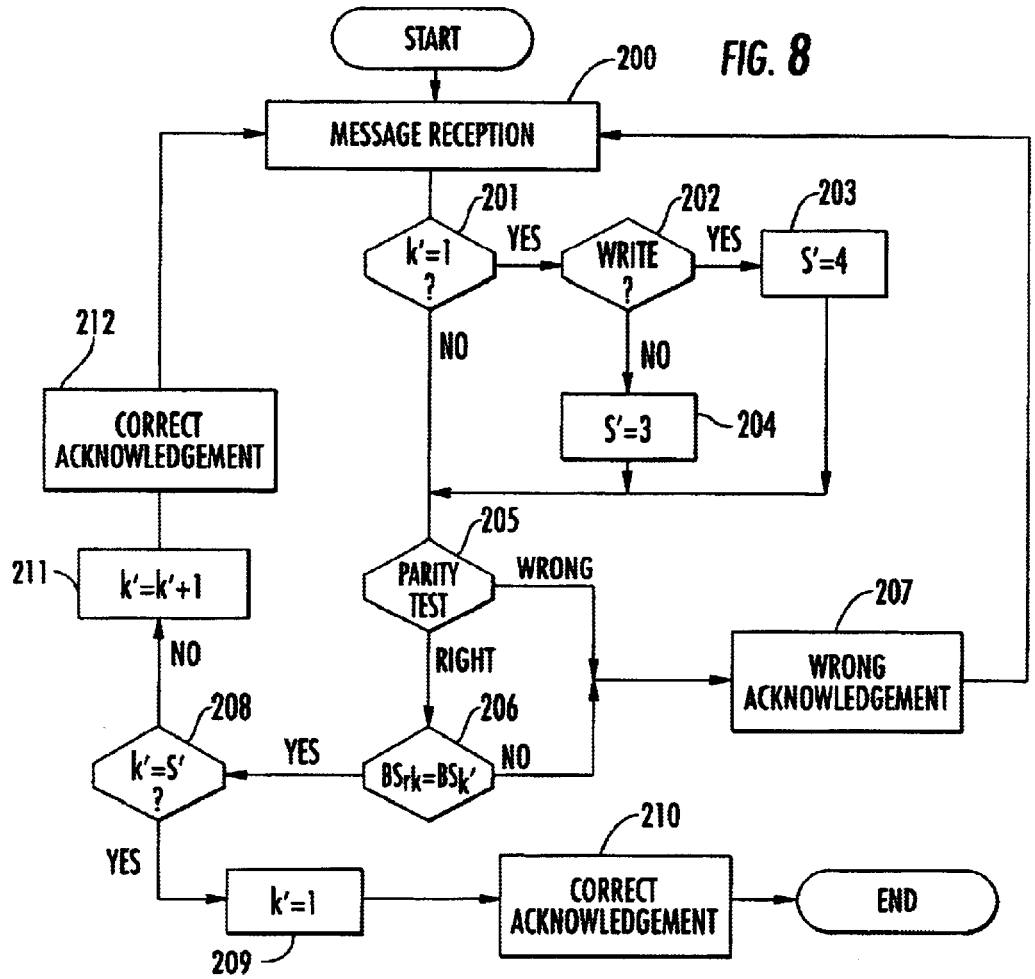
FIG. 8 shows a flow chart of a program for the implementation of the method according to the invention, upon the reception of a message.

A description shall now be given of a mode of implementation of the method according to the invention. We shall single out firstly the transmission of a message (FIG. 7) and secondly the reception of a message (FIG. 8). FIG. 7 shows a flow chart of a program for the implementation of a method according to the invention enabling the generation, for each stage of a transmission sequence, of the values of the end-of-transmission bits that are significant to the nature of useful information sent.

In this figure, the letter k designates an index that can assume a value of 1 to 4. This index signifies the current phase of the transmission sequence. It is dependent on what has been defined here above as the transmission counter.

In a first step 101, after the start of the program, a test is performed to determine whether the operation is in the first phase of the transmission sequence. If the answer is yes, then the useful information word is necessarily a control instruction. A test step 102 then makes it possible to determine whether the useful information word corresponds to a write instruction. If the answer is yes, then a natural integer S, in a step 103, takes the value 4. If the answer is no, then the integer S, in a step 104, takes the value 3. In every case, this value S determines the number of phases in the transmission sequence. Thus the values of the end-of-transmission bits BS1 and BS2 describe different sequences depending on whether the transmitted instruction is a read instruction or a write instruction.

Once the number of phases of the transmission sequence has been determined, values $BS_{ek}$ are assigned to the two end-of-transmission bits. These values are assigned in a step 105 according to values $BS_k$ which have been determined beforehand as a function of the nature of the useful information transmitted.

If the first phase of the transmission sequence has already been acknowledged, namely if the response to the test 101 is yes, then direct access is obtained to this step 105 for the assignment of the values of the end-of-transmission bits. Following this step 105, a step 106 includes the transmission of the message. Then comes a step 107 which is a test seeking to provide for the accurate acknowledgment of the message sent.

If the acknowledgment is not validated, then the flow chart of the illustrated program embodiment starts directly from the test step 101. If the acknowledgment is accurately validated, then in a step 108, the value of the index k is incremented by one unit (k=k+1).

A test step 109 follows this step 108. It determines whether the value of the index k has reached the value of the integer S. If the response is positive, the transmission sequence is completed. In a step 110, the index k is then reset at a value 1. This is the end of the program. If the response to the test 109 is negative, the loop of the program starts again from the step 101.

FIG. 8 shows a flow chart of a program for the implementation of the method according to the invention, used to ascertain the integrity of the useful information received. This verification is done with respect to the values of the end-of-transmission bits that accompany this useful information word. In this figure, the letter k' plays a role in the flow chart that is similar to the one played by the letter k in the flow chart of FIG. 5.

In a first step 200, after the beginning of the program, the message sent by the transmission unit is received in the form of bits $BS_{rk'}$. In a step 201, a test is performed to find out if the operation is in the first phase of the transmission sequence. The first phase of the transmission sequence corresponds to k'=1. If the answer is yes, then the useful information word is necessarily a control instruction. A test 202 then makes it possible, by a decoding of the bits of the useful information word received, to determine whether the useful information word corresponds to a write instruction. If the answer is yes, then a natural integer S' in a step 203, takes the value 4. If the answer is no, then the integer S', in a step 204, takes the value 3. This value S', in any case, determines the number of phases in the transmission sequence.

At the end of the step 204, or at the end of the step 202 if the response to the test 201 is negative, a parity test 205 is carried out according to the principles explained above. Another test 206 follows the parity test 205 if the result of this test proves to be right.

The test step 206 includes comparing the value of the end-of-transmission bits received $BS_{rk}$, with the value of the expected end-of-transmission bits $BS_k$. The value of the end-of-transmission bits is correlated with the nature of the useful information word received.

If one of the two tests 205 or 206 reveals any irregularity whatsoever in transmission, then the flow chart leads to a step 207 which provokes a retransmission of the phase of reception in progress. This retransmission is demanded by the transmission of erroneous acknowledgment information. This erroneous information is expected at the step 107 of the first program explained with reference to FIG. 7.

Only the transmission of the last useful information word is demanded in the case of a transmission that has not been accurately acknowledged. Neither the transmission sequence nor the reception sequence is resumed at its first stage. In the case of an erroneous acknowledgment, the procedure starts again from the step 201. Should both tests 205 and 206 prove to be positive, a comparison test 208 is performed. This test 208 is used to determine whether the end of the sequence of reception of useful information has been reached.

In the event of a positive response, the variable k' is reset at 1 in a step 209 and a message corresponding to an accurate acknowledgment is transmitted in a step 210. The end of the program is then reached. If the answer to the test 208 is negative, namely if the last phase of the reception sequence has not been reached, the value of the variable k' is incremented by one unit (k'=k'+1) in a step 211. In a step 212 that directly follows the step 211, information on accurate acknowledgment is transmitted. The program then starts again at the step 200.

That which is claimed is:

1. A method of communicating between a master unit and a slave unit, comprising:

generating a message, at the master unit, comprising at least one service bit and a useful information word of a specified type, the at least one service bit comprising at least one coherence bit having a value signifying the specified type of the useful information word;

transmitting the message from the master unit to the slave unit;

receiving the message at the slave unit;

extracting the useful information word and the at least one coherence bit from the received message;

decoding a value of the at least one coherence bit;

incrementing a reception counter based upon a check between the specified type of useful information transmitted and the value of the at least one coherence bit; and directing the useful information word based upon a value of the reception counter.

2. A method according to claim 1, wherein the at least one coherence bit comprises a word of at least two coherence bits.

3. A method according to claim 1, wherein the at least one coherence bit also indicates an end of the message.

4. A method according to claim 1, wherein the useful information word is one of a control instruction, a memory address, and a data element.

5. A method according to claim 1, wherein the at least one coherence bit has a value establishing a distinction between most significant bits and least significant bits of a memory address.

6. A method according to claim 1, wherein the at least one coherence bit has a value establishing a distinction between most significant bits and least significant bits of a transmitted data element.

7. A method according to claim 1, wherein the at least one coherence bit has a different value depending on whether the transmitted message is a read instruction or a write instruction.

8. A method according to claim 1, further comprising the step of transmitting a last useful information word responsive to a transmission that has not been accurately acknowledged.

9. A method according to claim 1, wherein the at least one service bit further comprises at least a start bit.

10. A method according to claim 1, wherein the at least one service bit further comprises at least a check bit.

11. A method of communicating comprising;

generating a message, at a first unit, comprising at least one service bit and a useful information word of a specified type, the at least one service bit comprising at least one coherence bit having a value signifying the specified type of the useful information word;

transmitting the message from the first unit to a second unit;

extracting the useful information word and the at least one coherence bit from the received message at the second unit;

incrementing a reception counter based upon a check between the specified type of useful information transmitted and the at least one coherence bit; and directing the useful information word based upon a value of the reception counter.

12. A method according to claim 11, wherein the first unit comprises a master unit and the second unit comprises a slave unit.

13. A method according to claim 11, wherein the at least one coherence bit also indicate an end of the message.

14. A method according to claim 11, wherein the useful information word is one of a control instruction, a memory address, and a data element.

15. A method according to claim 11, wherein the at least one coherence bit have a value establishing a distinction between most significant bits and least significant bits of a memory address.

16. A method according to claim 11, wherein the at least one coherence bit have a value establishing a distinction between most significant bits and least significant bits of a transmitted data element.

17. A method according to claim 11, wherein the at least one coherence bit have a different value depending on whether the transmitted message is a read instruction or a write instruction.

18. A method according to claim 11, further comprising the step of transmitting a last useful information word responsive to a transmission that has not been accurately acknowledged.

19. A communication apparatus comprising:
    a master unit and a slave unit, said master unit for transmitting messages to said slave unit, each message comprising a useful information word of a specified type and at least one coherence bit having a value signifying the specified type of the useful information word transmitted;
    said slave unit comprising
        a reception counter,
        a reception selector for directing the useful information word in connection with a value of the reception counter, and
        a check unit for extracting the useful information word and the at least one coherence bit from a received message, and incrementing the reception counter based upon a check between the specified type of useful information transmitted and the value of the at least one coherence bit.

20. A communication apparatus according to claim 19, wherein the at least one coherence bit comprises a word of at least two coherence bits.

21. A communication apparatus according to claim 19, wherein the at least one coherence bit also indicates an end of the respective message.

22. A communication apparatus according to claim 19, wherein the useful information word is one of a control instruction, a memory address, and a data element.

23. A communication apparatus according to claim 19, wherein the at least one coherence bit has a value establishing a distinction between most significant bits and least significant bits of a memory address.

24. A communication apparatus according to claim 19, wherein the at least one coherence bit has a value establishing a distinction between most significant bits and least significant bits of a transmitted data element.

25. A communication apparatus according to claim 19, wherein the at least one coherence bit has a different value depending on whether the transmitted message is a read instruction or a write instruction.

26. A communication apparatus according to claim 19, wherein said slave unit requests transmission of a last useful information word responsive to a transmission that has not been accurately acknowledged.

27. A method of communicating between a master unit and a slave unit, comprising:
    generating a message, at the master unit, comprising at least one service bit and a useful information word of a specified type, the at least one service bit comprising at least one coherence bit having a value signifying the specified type of the useful information word, and the at least one coherence bit also indicating an end of the message; and
    transmitting the message from the master unit to the slave unit.

28. A method according to claim 27, wherein the at least one coherence bit comprises a word of at least two coherence bits.

29. A method according to claim 27, wherein the useful information word is one of a control instruction, a memory address, and a data element.

30. A method according to claim 27, wherein the at least one coherence bit has a value establishing a distinction between most significant bits and least significant bits of a memory address.

31. A method according to claim 27, wherein the at least one coherence bit has a value establishing a distinction between most significant bits and least significant bits of a transmitted data element.

32. A method according to claim 27, wherein the at least one coherence bit has a different value depending on whether the transmitted message is a read instruction or a write instruction.

33. A method according to claim 29, wherein the at least one service bit further comprises at least a start bit.

34. A method according to claim 27, wherein the at least one service bit further comprises at least a check bit.

* * * * *